United States Patent
Szekely et al.

(10) Patent No.: US 11,347,609 B1
(45) Date of Patent: May 31, 2022

(54) FAILED MEDIA CHANNEL RECOVERY THROTTLING

(71) Applicant: International Business Machines Corporation, Armonk, NY (US)

(72) Inventors: Matthew Szekely, Austin, TX (US); Robert Edward Galbraith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/243,983

(22) Filed: Apr. 29, 2021

(51) Int. Cl.
*G06F 11/00* (2006.01)
*G06F 11/20* (2006.01)
*G06F 11/10* (2006.01)

(52) U.S. Cl.
CPC ........ *G06F 11/2094* (2013.01); *G06F 11/108* (2013.01); *G06F 11/1088* (2013.01); *G06F 2201/81* (2013.01)

(58) Field of Classification Search
CPC ....... G06F 2211/1073; G06F 2212/261; G06F 2212/262; G06F 11/0727; G06F 11/073; G06F 11/08–1096; G06F 11/1612; G06F 11/2053–2097
See application file for complete search history.

(56) References Cited

U.S. PATENT DOCUMENTS

| | | |
|---|---|---|
| 10,019,332 B1 | 7/2018 | Sehgal |
| 10,825,477 B2 | 11/2020 | Roberts |
| 10,901,868 B1* | 1/2021 | Dennin, III ......... G06F 11/1666 |
| 2013/0166857 A1* | 6/2013 | Kawano ............... G06F 11/108 711/155 |
| 2013/0246890 A1* | 9/2013 | Au ...................... G06F 11/1068 714/764 |
| 2016/0283308 A1* | 9/2016 | Earhart ................ G11C 7/1063 |
| 2017/0242768 A1* | 8/2017 | Park ........................ G06F 3/064 |
| 2019/0332505 A1* | 10/2019 | Jung ...................... G11C 29/04 |
| 2020/0218617 A1 | 7/2020 | Knestele |

* cited by examiner

*Primary Examiner* — Michael Maskulinski
(74) *Attorney, Agent, or Firm* — David K. Mattheis; Maeve M Carpenter

(57) ABSTRACT

In an approach to failed media channel recovery throttling, responsive to detecting a programming error on an addressable unit during programming of a block stripe, the block stripe is placed on a recovery/data migration queue. An error counter for the addressable unit on which the programming error occurred is incremented. The block stripes from the recovery/data migration queue are built excluding a specific channel containing the addressable unit on which the programming error occurred. Responsive to determining that the queue for the recovery/data migration is empty, building the block stripes resumes using the plurality of channels, where the specific channel containing the addressable unit on which the programming error occurred is included. Responsive to determining that a number of errors on a specific addressable unit exceeds a predetermined threshold based on the error counter for the specific addressable unit, the specific addressable unit is decommissioned.

20 Claims, 5 Drawing Sheets

FAILED MEDIA CHANNEL RECOVERY THROTTLING

BACKGROUND

The present invention relates generally to the field of semiconductor-based storage devices, and more particularly to failed media channel recovery throttling.

Flash memory is an electronic non-volatile computer memory storage medium that can be electrically erased and reprogrammed. NAND flash uses floating-gate transistors, but they are connected in a way that resembles a NAND gate: several transistors are connected in series, and the bit line is pulled low only if all the word lines are pulled high (above the threshold voltage of the transistor). These groups are then connected via some additional transistors to a bit line array. Compared to NOR flash, replacing single transistors with serial-linked groups adds an extra level of addressing, such that NAND flash is addressed by page, word and bit.

Flash storage is a solid-state technology that uses flash memory chips for writing and storing data. Solutions range from USB drives to enterprise-level arrays. Flash storage can achieve very fast response times (microsecond latency), compared to hard drives with moving components. It uses non-volatile memory, which means that data is not lost when the power is turned off. It is highly available and uses less energy and physical space than mechanical disk storage.

A storage array combines multiple disk drives to enable block-based data storage. It separates storage from network communication and connection functions to provide more capacity than a group of file servers. With a storage array, multiple servers across the organization can efficiently access the same stored data. A storage array is also known as a disk array or disk storage array.

A solid-state disk (SSD) flash drive stores data using flash memory. An SSD has advantages over a hard disk drive (HDD). Hard disks have an inherent latency, caused by mechanical components. A solid-state system has no moving parts and therefore less latency, so fewer SSDs are needed. Since most modern SSDs are flash-based, flash storage is synonymous with a solid-state system.

All-flash arrays use only flash memory for storage. These modern architectures are designed to maximize performance, without the constraints of SSD storage area network (SAN) legacy functions. They have ultra-low latency and are highly available and are ideally suited for multicloud environments and storage protocols such as NVMe.

SUMMARY

Embodiments of the present invention disclose a method, a computer program product, and a system for failed media channel recovery throttling. In one embodiment, responsive to detecting a programming error on an addressable unit during programming of a block stripe, the block stripe is placed on a recovery/data migration queue. An error counter for the addressable unit on which the programming error occurred is incremented. The block stripes from the recovery/data migration queue are built, where the block stripes are built excluding a specific channel containing the addressable unit on which the programming error occurred. Responsive to determining that the queue for the recovery/data migration is empty, building the block stripes resumes using the plurality of channels, where the specific channel containing the addressable unit on which the programming error occurred is included. Responsive to determining that a number of errors on a specific addressable unit exceeds a predetermined threshold based on the error counter for the specific addressable unit, the specific addressable unit is decommissioned, where decommissioning the specific addressable unit prevents any block stripe from using the specific addressable unit.

DETAILED DESCRIPTION

NAND flash media is subdivided into smaller units that are addressable via channel, die, plane, or block. Media operations such as reading, erasing, and programming have special rules regarding what operations can be done to which subunits in parallel, e.g., a program operation can be done in parallel to blocks of the same die and incrementing plane.

Figure 3:
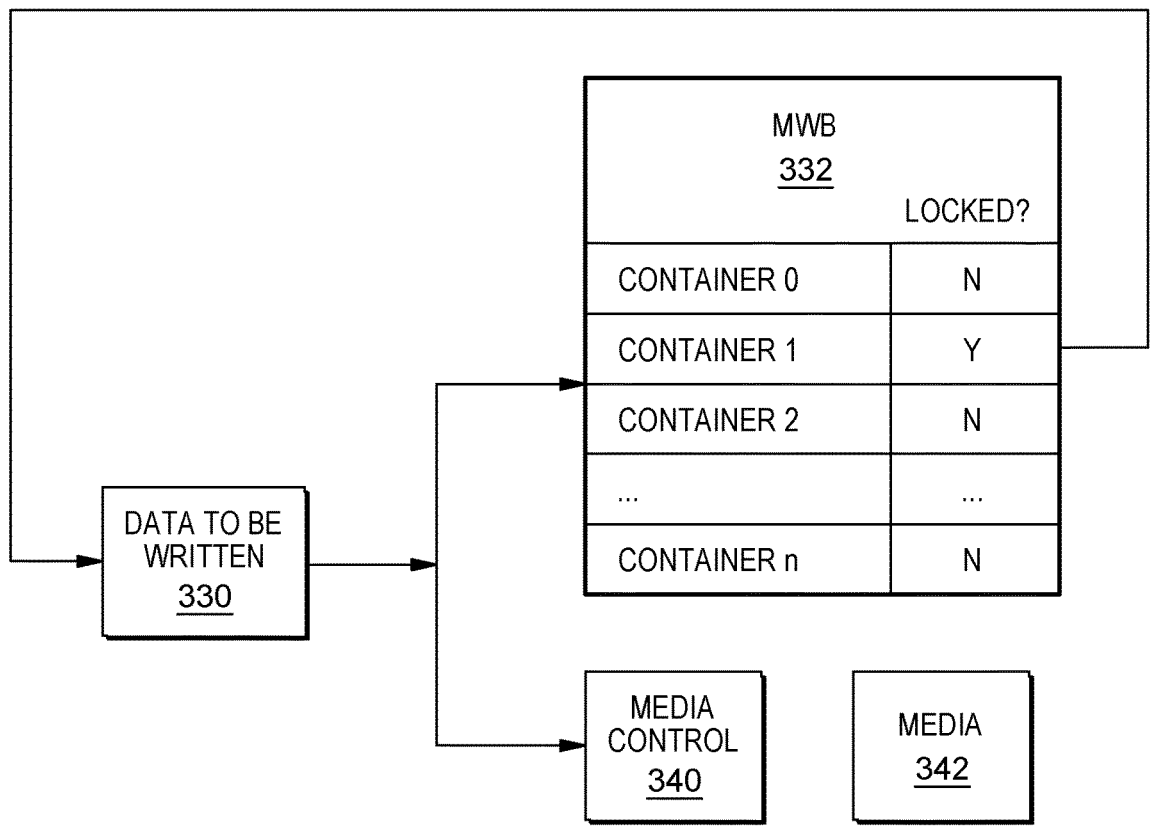
FIG. 3 is a functional block diagram illustrating an example of the data flow to the media write buffer (MWB) of a storage class memory, in accordance with an embodiment of the present invention.

In a memory adapter for such media, these sub-units must be grouped in block stripes according to these access rules in order to take advantage of these multi-plane operations and optimize performance. During normal operation a block stripe will be created across all available channels on the NAND devices. Program operations are done across entire block stripes at a time. The data to be written to the media is sent to both the media control and also buffered in DRAM cache 'containers' as illustrated in FIG. 3 below. A single block stripe fits in each container and the container remains 'locked' until the data is written to the media successfully.

If there is a program error the container remains locked until the error is recovered. Currently, the memory adapter firmware is able to queue the block stripe for asynchronous recovery, but this takes a long time relative to a successful operation and ties up space in the containers in the meantime. While the data in the block stripe which encountered the program error is being recirculated, i.e., migrated to a different block stripe, the memory adapter continues to perform more program operations due to incoming data that needs to be written to media. The worst-case scenario occurs where an entire media channel fails, and every program operation then starts to fail because all block stripes use that failed channel. These program errors tie up more and more space in the containers and can eventually starve the memory adapter to the point it is no longer able to operate.

The present invention avoids this resource starvation by throttling the amount of programming of block stripes which include channels that have recently had program errors, by detecting if a hardware failure has occurred, and by proactively invalidating the addressable unit, i.e., the channel, die, plane or block, to avoid continuously encountering errors.

The present invention accomplishes these goals as follows. First, the present invention will initially build block stripes using all available media channels and program operations will normally execute successfully. At some point a media channel will fail and the adapter will hit its first program error. The present invention places the block stripe that encountered the programming error on a recovery/data migration queue, records which channel encountered the error, decommissions the channel that encountered the error for the duration of the recovery/data migration, and permanently decommissions the specific media block that encountered the programming error. While the first program error is being handled, the present invention handles program operations using block stripes which are built excluding the channel that encountered the error. Therefore, no additional program errors will be encountered due to the channel that encountered the error, thereby throttling the errors until the recovery/data migration is complete.

As the block stripes on the recovery/data migration queue are successfully programmed into the media, they are deleted from the recovery/data migration queue. Eventually the recovery/data migration queue of block stripes is empty and the invention resumes building block stripes with all available channels. If the adapter continues to hit errors, once it has reached a predetermined threshold percentage of errors on any specific addressable unit, that addressable unit is permanently decommissioned and will no longer be used.

Figure 1:
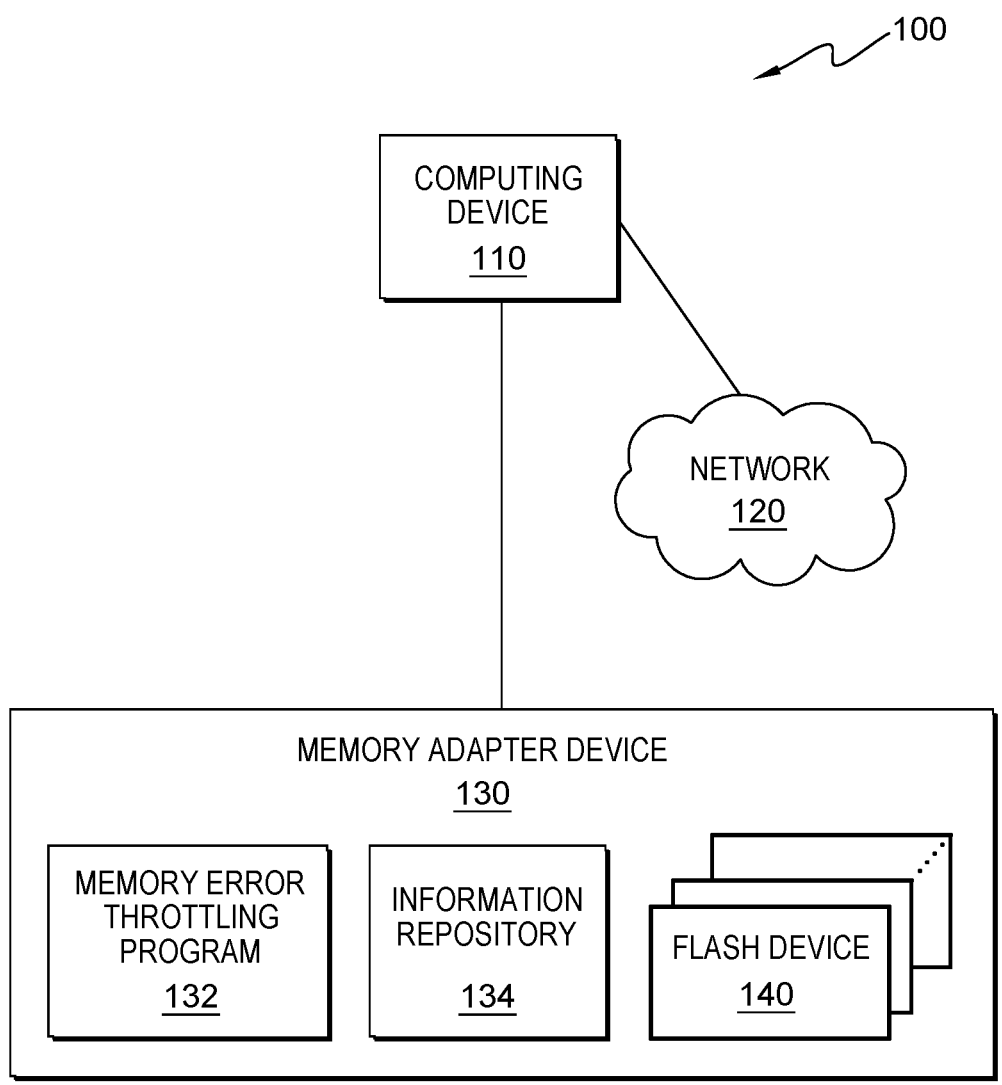
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of memory error throttling program 132 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

Distributed data processing environment 100 includes memory adapter device 130. Memory adapter device 130 is the memory adapter controlling the NAND flash memory. Although only a single memory adapter is shown in FIG. 1, distributed data processing environment 100 may contain any number of memory adapter devices.

In an embodiment, memory adapter device 130 includes flash devices 140, which are the actual NAND flash memory devices controlled by memory adapter device 130. In an embodiment, memory adapter device 130 may include any number of flash devices 140. In an embodiment, flash device 140 is a memory device. In another embodiment, flash device 140 may be a solid-state disk (SSD) device. In yet another embodiment, flash device 140 may be any other flash-based storage device.

In an embodiment, memory adapter device 130 includes memory error throttling program 132. In an embodiment, memory error throttling program 132 is a program, application, or subprogram of a larger program for failed media channel throttling.

In an embodiment, memory adapter device 130 includes information repository 134. In an embodiment, information repository 134 may be managed by memory error throttling program 132. In an alternate embodiment, information repository 134 may be managed by the operating system of the device, alone, or together with, memory error throttling program 132. Information repository 134 is a data repository that can store, gather, compare, and/or combine information. In some embodiments, information repository 134 is located externally to memory adapter device 130 and accessed through a communication network, such as network 120. In some embodiments, information repository 134 resides on memory adapter device 130. In some embodiments, information repository 134 may reside on another computing device (not shown), provided that information repository 134 is accessible by memory adapter device 130. Information repository 134 includes, but is not limited to, program data, memory configuration data, block data, cache data, buffer data, media configuration data, channel data, and other data that is received by memory error throttling program 132 from one or more sources, and data that is created by memory error throttling program 132.

Figure 2:
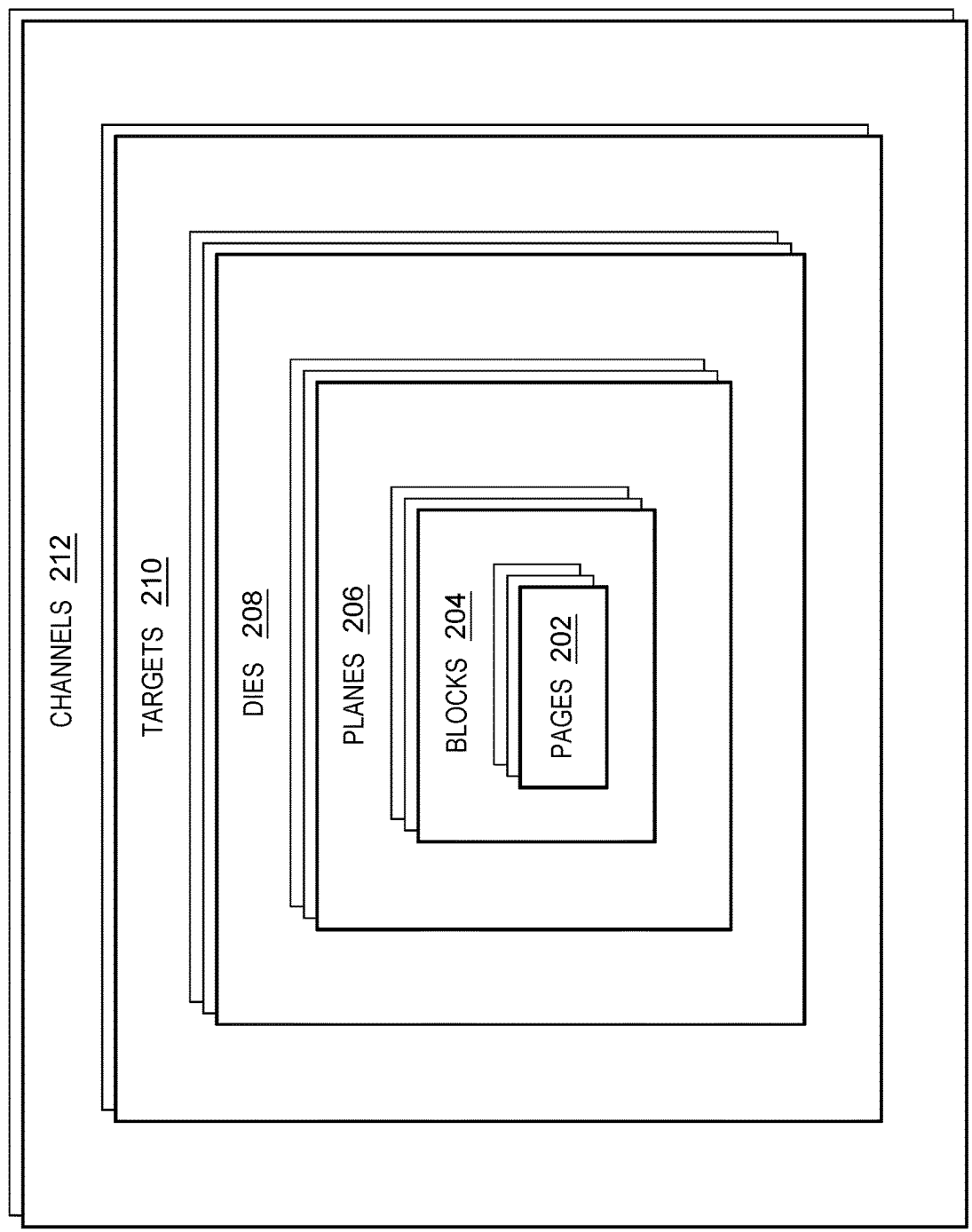
FIG. 2 is an example of the organization of a flash memory device, in accordance with an embodiment of the present invention.

FIG. 2 is an example of the organization of a flash memory device, in accordance with an embodiment of the present invention. It should be appreciated that the diagram depicted in FIG. 2 illustrates one possible organization of a typical flash memory device. Many modifications to the depicted organization may be made by those skilled in the art without departing from the scope of the invention as recited by the claims.

In the example flash memory device organization of FIG. 2, pages 202 are the smallest unit that can be programmed in the flash device. In an example flash device, a page may contain approximately 4k bytes. Blocks 204 are the smallest unit that can be erased in the flash device. In an example flash device, a block may contain 768 pages. Planes 206 contain a certain number of blocks that are typically connected through the same bitline. Typically, identical concurrent operations can take place on each plane within a die. Dies or logical unit numbers (LUNs) 208 consist of one or more planes, and the peripheral circuitry that is needed to perform all the read/program/erase operations. Targets or chip enables (CEs) 210 are a unit of the flash device that can be selected using one or more chip enable signals. For example, a flash device may contain 2 or 4 largely independent units of memory which are selected externally by 1 or 2 chip enable signals. Channels 212 are the number of pathways to the flash devices that the memory adapter can operate simultaneously.

FIG. 3 is a functional block diagram illustrating an example of the data flow to the MWB of a storage class memory, in accordance with an embodiment of the present invention.

In the example of FIG. 3, data to be written 330 represents the incoming data to be written to the media. MWB 332 is a DRAM cache that holds the incoming data pending programming into the media. Media control 340 is the actual memory adapter for the flash memory, which manages reading, programming, and erasing data on the flash media. Media 342 is the actual flash media, typically fast NAND flash, for the storage system.

In the detailed example of FIG. 3, incoming data to be written 330 is written to both the MWB 332 and into the media 342 in parallel. In the event that media 342 encounters a programming error while writing the data, the data existing in MWB 332 can be recirculated back into the data to be written 330 such that it can be written to another block stripe.

MWB 332 is organized as a series of containers, where a container stores the data for one block stripe. The "Locked" field in MWB 332 denotes the status of the data for each container in MWB 332. The status is "locked" (shown as "Y" in FIG. 3) when the data for that container has not yet been programmed into media 342, or if a programming failure was encountered in response to an attempt to program the data for that container into media 342. Once the container has been successfully programmed into media 342, the status is changed to "unlocked" (shown as "N" in FIG. 3) and the container may be reused.

Figure 4:
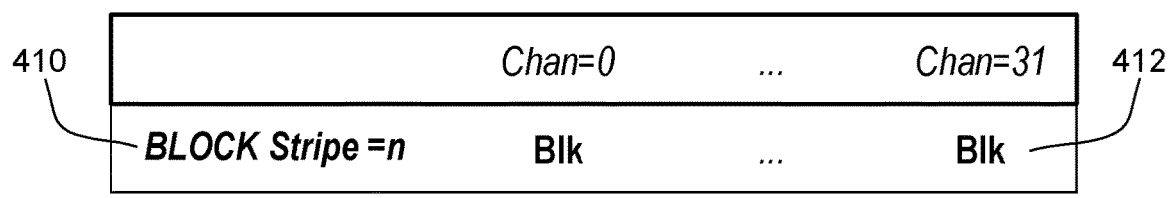
FIG. 4 illustrates an example of a block stripe, in accordance with an embodiment of the present invention.

FIG. 4 illustrates an example of a block stripe, in accordance with an embodiment of the present invention. In the example shown in FIG. 4, the block stripe is composed of up to 32 NAND blocks with all blocks being for the same die number/plane number, and each block being on a different channel. In other embodiments, the block stripe may contain any number of flash blocks. Block stripe 410 is the set of blocks, one on each channel, with the same die number and plane number. Block 412 is one NAND flash block on block stripe 410.

Figure 5:
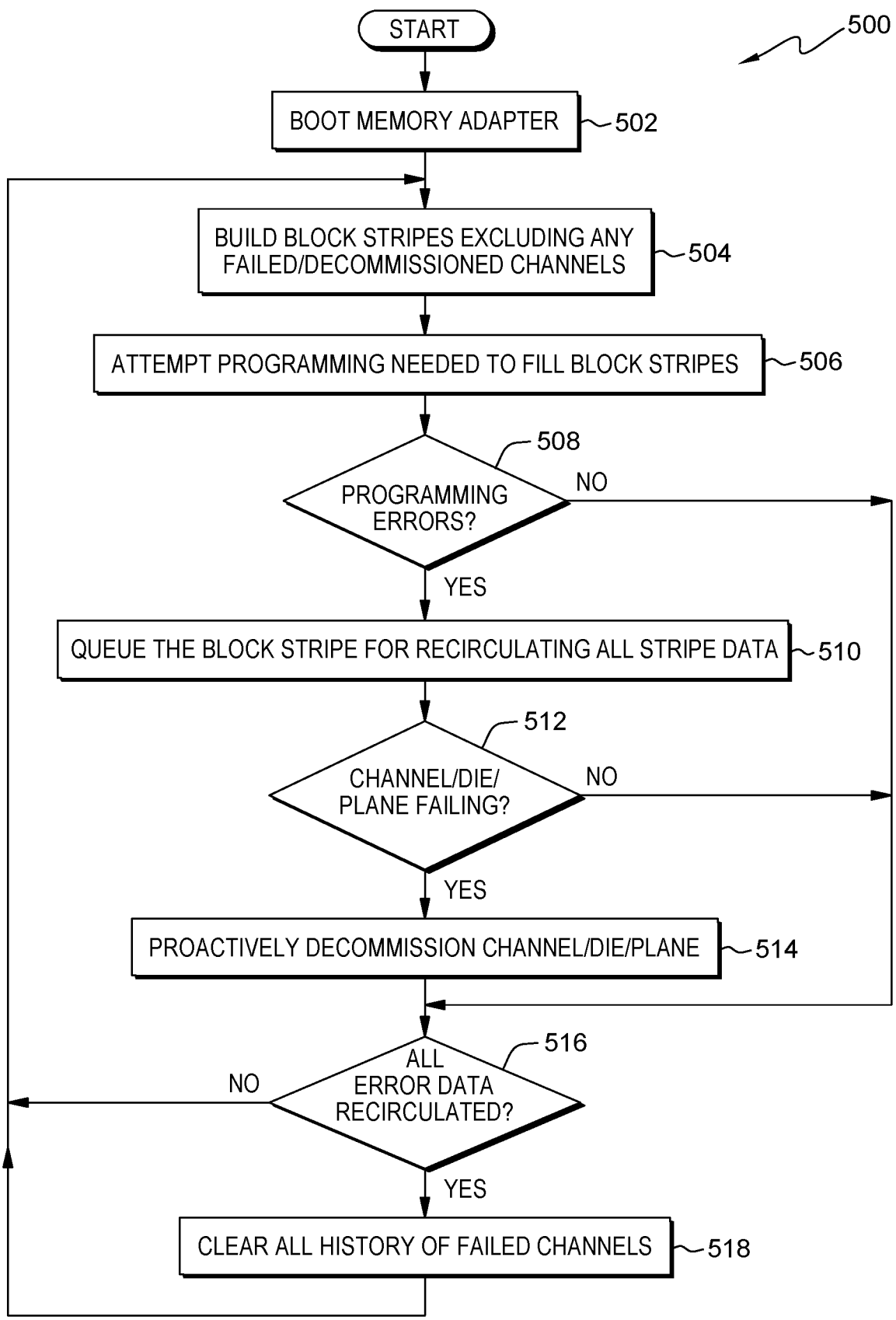
FIG. 5 is a flowchart depicting operational steps performed by the memory error throttling program for failed media channel throttling, in accordance with an embodiment of the present invention.

FIG. 5 is a flowchart depicting operational steps performed by memory error throttling program 132 for failed media channel throttling, in accordance with an embodiment of the present invention. In an alternative embodiment, the steps of workflow 500 may be performed by any other program while working with memory error throttling program 132. It should be appreciated that embodiments of the present invention provide at least for failed media channel recovery throttling. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, memory error throttling program 132 boots memory adapter device 130 normally. In an embodiment, memory error throttling program 132 builds block stripes excluding any failed channels from the list of failed channels or any previously decommissioned channels. In an embodiment, memory error throttling program 132 attempts to program the media to fill the block stripe. In an embodiment, memory error throttling program 132 determines if any errors were encountered during programming. If memory error throttling program 132 has detected a programming error, then memory error throttling program 132 records the error for the addressable unit. In an embodiment, memory error throttling program 132 determines if an addressable unit is failing. In an embodiment, if memory error throttling program 132 determines that an addressable unit is failing, then memory error throttling program 132 proactively decommissions the failing addressable unit. In an embodiment, memory error throttling program 132 determines if all data has been recirculated for block stripes that encountered errors during the programming operation. In an embodiment, since all the error data has been recirculated and written into block stripes that exclude the failed channel, memory error throttling program 132 clears the history of the failed channel that has been resolved.

Memory error throttling program 132 boots memory adapter device 130 (step 502). In an embodiment, memory error throttling program 132 boots memory adapter device 130 normally. In an embodiment, memory error throttling program 132 initializes the list of failed channels to empty.

Memory error throttling program 132 builds block stripes excluding any failed/decommissioned channels (step 504). In an embodiment, memory error throttling program 132 builds block stripes excluding any failed channels from the list of failed channels or any previously decommissioned channels. Initially this list is empty, but if failed channels are encountered, they will be added to the list and future passes of memory error throttling program 132 will exclude those failed channels.

Memory error throttling program 132 attempts programming needed to fill the block stripes (step 506). In an embodiment, memory error throttling program 132 attempts to program the media to fill the block stripes.

Memory error throttling program 132 determines if there were any programming errors (decision block 508). In an embodiment, memory error throttling program 132 determines if any errors were encountered during programming. In an embodiment, if memory error throttling program 132 has detected a programming error, memory error throttling program 132 records the error for the addressable unit on which the error was encountered. In an embodiment, memory error throttling program 132 keeps a record of the errors encountered for each addressable unit. In an embodiment, if memory error throttling program 132 determines that no errors were encountered during programming ("no" branch, decision block 508), then memory error throttling program 132 proceeds to decision block 516 to determine if all error data has been recirculated. In an embodiment, if memory error throttling program 132 determines that errors were encountered during programming ("yes" branch, decision block 508), then memory error throttling program 132 proceeds to step 510.

Memory error throttling program 132 queues the block stripe for recirculating all stripe data (step 510). If memory error throttling program 132 has detected a programming error, then memory error throttling program 132 immediately and permanently decommissions the block on which the error occurred, and temporarily decommissions the channel on which the error was encountered in order to throttle the number of errors encountered until the block stripes can be recovered. In an embodiment, memory error throttling program 132 then records the error by incrementing an error counter for the addressable unit on which the error was encountered. In an embodiment, memory error throttling program 132 keeps a record of the errors encountered for each addressable unit. In an embodiment, memory error throttling program 132 queues the block stripe data for recirculation. In an embodiment, the queued block stripe data is recirculated by migrating the data to a different block stripe. In an embodiment, as the block stripes on the recovery/data migration queue are successfully migrated to a different block stripe, they are deleted from the recovery/data migration queue.

Memory error throttling program 132 determines if an addressable unit is failing (decision block 512). In an embodiment, memory error throttling program 132 determines if an addressable unit is failing. In an embodiment, memory error throttling program 132 records each programming failure in step 510 by the addressable unit. In an embodiment, each time memory error throttling program 132 encounters a programming error for an addressable unit, memory error throttling program 132 checks the number of programming errors for that addressable unit against a predetermined percentage threshold. In an embodiment, if the percentage of programming errors for that addressable unit exceeds the predetermined threshold, then memory error throttling program 132 determines that the addressable unit is failing.

In an embodiment, if memory error throttling program 132 determines that an addressable unit is not failing ("no" branch, decision block 512), then memory error throttling program 132 proceeds to decision block 516 to determine if all error data has been recirculated. In an embodiment, if memory error throttling program 132 determines that an addressable unit is failing ("yes" branch, decision block 512), then memory error throttling program 132 proceeds to step 514.

Memory error throttling program 132 proactively decommissions the addressable unit (step 514). In an embodiment, if memory error throttling program 132 determines that an addressable unit is failing in decision block 512, then memory error throttling program 132 proactively decommissions the failing addressable unit. In an embodiment, memory error throttling program 132 proactively decommissions the failing addressable unit by marking the addressable unit as disabled in the media control, e.g., media control 340 of FIG. 3, which prevents any block stripe from using the specific addressable unit. In another embodiment, memory error throttling program 132 proactively decommissions the failing addressable unit by any other method as would be known by one skilled in the art.

Memory error throttling program 132 determines if all the error data has been recirculated (decision block 516). In an embodiment, memory error throttling program 132 determines if all data has been recirculated for block stripes that encountered errors during the programming operation. In an embodiment, if memory error throttling program 132 determines that not all data has been recirculated for block stripes that encountered errors during the programming operation ("no" branch, decision block 516), then memory error throttling program 132 returns to step 504 to continue building the block stripes. In an embodiment, if memory error throttling program 132 determines that all data has been recirculated for block stripes that encountered errors during the programming operation ("yes" branch, decision block 516), then memory error throttling program 132 proceeds to step 518.

Memory error throttling program 132 clears all history of failed channels (step 518). In an embodiment, since all the error data has been recirculated and written into block stripes that exclude the channel temporarily decommissioned in step 510, memory error throttling program 132 clears the history of the temporarily decommissioned channel that has been resolved, and the temporarily decommissioned channel is put back into service. In an embodiment, this applies to a channel temporarily decommissioned in step 510. Any addressable unit, including a channel, that was permanently decommissioned in step 514 is not put back into service. In an embodiment, memory error throttling program 132 returns to step 504 to continue building the block stripes.

Figure 6:
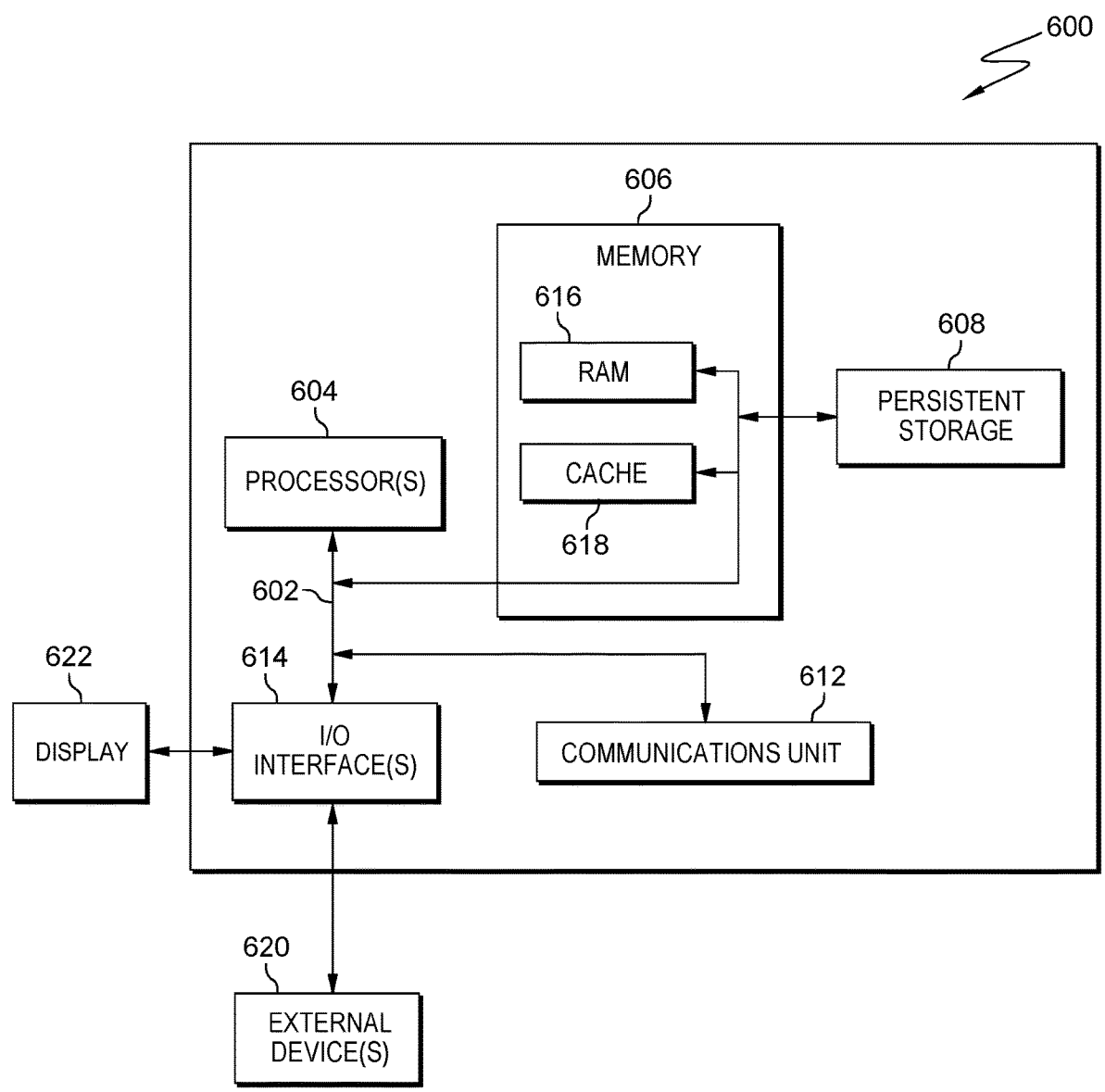
FIG. 6 depicts a block diagram of components of the computing device executing the memory error throttling program within the distributed data processing environment of FIG. 1, in accordance with an embodiment of the present invention.

FIG. 6 depicts a block diagram of components of the computing device executing memory error throttling program 132 within the distributed data processing environment of FIG. 1, in accordance with an embodiment of the present invention. FIG. 6 displays computer 600; one or more processor(s) 604 (including one or more computer processors); communications fabric 602; memory 606, including random-access memory (RAM) 616 and cache 618; persistent storage 608; communications unit 612; I/O interfaces 614; display 622; and external devices 620. It should be appreciated that FIG. 6 provides only an illustration of one embodiment and does not imply any limitations with regard to the environments in which different embodiments may be implemented. Many modifications to the depicted environment may be made.

As depicted, computer 600 operates over communications fabric 602, which provides communications between computer processor(s) 604, memory 606, persistent storage 608, communications unit 612, and I/O interface(s) 614. Communications fabric 602 may be implemented with any architecture suitable for passing data or control information between processors 604 (e.g., microprocessors, communications processors, and network processors), memory 606, external devices 620, and any other hardware components within a system. For example, communications fabric 602 may be implemented with one or more buses.

Memory 606 and persistent storage 608 are computer readable storage media. In the depicted embodiment, memory 606 comprises RAM 616 and cache 618. In general, memory 606 can include any suitable volatile or non-volatile computer readable storage media. Cache 618 is a fast memory that enhances the performance of processor(s) 604 by holding recently accessed data, and near recently accessed data, from RAM 616.

Program instructions for memory error throttling program 132 may be stored in persistent storage 608, or more generally, any computer readable storage media, for execution by one or more of the respective computer processors 604 via one or more memories of memory 606. Persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. In the context of some embodiments of the present invention, the source of the various input data may be physically remote to computer 600 such that the input data may be received, and the output similarly transmitted via communications unit 612.

I/O interface(s) 614 allows for input and output of data with other devices that may be connected to computer 600. For example, I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., memory error throttling program 132, can be stored on such portable computer readable storage media and can be loaded onto persistent storage 608 via I/O interface(s) 614. I/O interface (s) 614 also connect to display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   responsive to detecting a programming error on an addressable unit during programming of a block stripe of one or more block stripes, placing, by one or more computer processors, the block stripe of the one or more block stripes on a recovery/data migration queue;
   incrementing, by the one or more computer processors, an error counter for the addressable unit on which the programming error occurred;
   building, by the one or more computer processors, the one or more block stripes from the recovery/data migration queue, wherein the one or more block stripes are built excluding a specific channel of a plurality of channels containing the addressable unit on which the programming error occurred;
   responsive to determining that the recovery/data migration queue is empty, resuming, by the one or more computer processors, building the block stripes using the plurality of channels, wherein the specific channel containing the addressable unit on which the programming error occurred is included; and
   responsive to determining that a percentage of errors on a specific addressable unit exceeds a predetermined threshold based on the error counter for the specific addressable unit, decommissioning, by the one or more computer processors, the specific addressable unit, wherein decommissioning the specific addressable unit prevents any block stripe of the one or more block stripes from using the specific addressable unit.

2. The computer-implemented method of claim 1, wherein the addressable unit is selected from a list consisting of a channel, a die, a plane and a block.

3. The computer-implemented method of claim 1, wherein building the one or more block stripes from the recovery/data migration queue, wherein the one or more block stripes are built excluding a specific channel of a plurality of channels containing the addressable unit on which the programming error occurred further comprises:
   recirculating, by the one or more computer processors, the any block stripe of the one or more block stripes, wherein the any block stripe is recirculated by migrating data from the any block stripe to a different block stripe.

4. The computer-implemented method of claim 1, wherein building the one or more block stripes from the recovery/data migration queue, wherein the one or more block stripes are built excluding a specific channel of a plurality of channels containing the addressable unit on which the programming error occurred further comprises:
   writing, by the one or more computer processors, a write data that is to be written to any block stripe to both a media and a container of a plurality of containers in a write buffer;
   locking, by the one or more computer processors, the container; and
   responsive to successfully writing the write data to the media, unlocking, by the one or more computer processors, the container.

5. The computer-implemented method of claim 4, wherein each container of the plurality of containers holds a single block stripe.

6. The computer-implemented method of claim 4, wherein the media is a NAND flash.

7. The computer-implemented method of claim 1, wherein each block stripe of the one or more block stripes is a set of blocks, wherein each block of the set of blocks has a same die number and a same plane number, and further wherein each block of the set of blocks is on a different channel of the plurality of channels.

8. A computer program product comprising one or more computer readable storage media and program instructions stored on the one or more computer readable storage media, the program instructions including instructions to:
   responsive to detecting a programming error on an addressable unit during programming of a block stripe of one or more block stripes, place the block stripe of the one or more block stripes on a recovery/data migration queue;
   increment an error counter for the addressable unit on which the programming error occurred;
   build the one or more block stripes from the recovery/data migration queue, wherein the one or more block stripes are built excluding a specific channel of a plurality of channels containing the addressable unit on which the programming error occurred;

responsive to determining that the queue for the recovery/data migration is empty, resume building the block stripes using the plurality of channels, wherein the specific channel containing the addressable unit on which the programming error occurred is included; and responsive to determining that a percentage of errors on a specific addressable unit exceeds a predetermined threshold based on the error counter for the specific addressable unit, decommission the specific addressable unit, wherein decommissioning the specific addressable unit prevents any block stripe of the one or more block stripes from using the specific addressable unit.

9. The computer program product of claim 8, wherein the addressable unit is selected from a list consisting of a channel, a die, a plane and a block.

10. The computer program product of claim 8, wherein build the one or more block stripes from the recovery/data migration queue, wherein the one or more block stripes are built excluding a specific channel of a plurality of channels containing the addressable unit on which the programming error occurred further comprises one or more of the following program instructions, stored on the one or more computer readable storage media, to:

recirculate the any block stripe of the one or more block stripes, wherein the any block stripe is recirculated by migrating data from the any block stripe to a different block stripe.

11. The computer program product of claim 8, wherein build the one or more block stripes from the recovery/data migration queue, wherein the one or more block stripes are built excluding a specific channel of a plurality of channels containing the addressable unit on which the programming error occurred further comprises one or more of the following program instructions, stored on the one or more computer readable storage media, to:

write a write data that is to be written to any block stripe to both a media and a container of a plurality of containers in a write buffer;

lock the container; and responsive to successfully writing the write data to the media, unlock the container.

12. The computer program product of claim 11, wherein each container of the plurality of containers holds a single block stripe.

13. The computer program product of claim 11, wherein the media is a NAND flash.

14. The computer program product of claim 8, wherein each block stripe of the one or more block stripes is a set of blocks, wherein each block of the set of blocks has a same die number and a same plane number, and further wherein each block of the set of blocks is on a different channel of the plurality of channels.

15. A computer system comprising:
one or more computer processors;
one or more computer readable storage media; and
program instructions stored on the one or more computer readable storage media for execution by at least one of the one or more computer processors, the stored program instructions including instructions to:

responsive to detecting a programming error on an addressable unit during programming of a block stripe of one or more block stripes, place the block stripe of the one or more block stripes on a recovery/data migration queue;

increment an error counter for the addressable unit on which the programming error occurred;

build the one or more block stripes from the recovery/data migration queue, wherein the one or more block stripes are built excluding a specific channel of a plurality of channels containing the addressable unit on which the programming error occurred;

responsive to determining that the queue for the recovery/data migration is empty, resume building the block stripes using the plurality of channels, wherein the specific channel containing the addressable unit on which the programming error occurred is included; and responsive to determining that a percentage of errors on a specific addressable unit exceeds a predetermined threshold based on the error counter for the specific addressable unit, decommission the specific addressable unit, wherein decommissioning the specific addressable unit prevents any block stripe of the one or more block stripes from using the specific addressable unit.

16. The computer system of claim 15, wherein the addressable unit is selected from a list consisting of a channel, a die, a plane and a block.

17. The computer system of claim 15, wherein build the one or more block stripes from the recovery/data migration queue, wherein the one or more block stripes are built excluding a specific channel of a plurality of channels containing the addressable unit on which the programming error occurred further comprises one or more of the following program instructions, stored on the one or more computer readable storage media, to:

recirculate the any block stripe of the one or more block stripes, wherein the any block stripe is recirculated by migrating data from the any block stripe to a different block stripe.

18. The computer system of claim 15, wherein build the one or more block stripes from the recovery/data migration queue, wherein the one or more block stripes are built excluding a specific channel of a plurality of channels containing the addressable unit on which the programming error occurred further comprises one or more of the following program instructions, stored on the one or more computer readable storage media, to:

write a write data that is to be written to any block stripe to both a media and a container of a plurality of containers in a write buffer;

lock the container; and responsive to successfully writing the write data to the media, unlock the container.

19. The computer system of claim 18, wherein each container of the plurality of containers holds a single block stripe.

20. The computer system of claim 18, wherein the media is a NAND flash.

* * * * *